United States Patent
Leutner et al.

(10) Patent No.: US 10,471,983 B2
(45) Date of Patent: Nov. 12, 2019

(54) METHOD AND DEVICE FOR OPERATING A POWER STEERING SYSTEM

(71) Applicant: Robert Bosch Automotive Steering GmbH, Schwäbisch Gmünd (DE)

(72) Inventors: Wilfried Leutner, Schwäbisch Gmünd (DE); Viktor Fast, Schwäbisch Gmünd (DE); Rainer Woeger, Schwäbisch Gmünd (DE)

(73) Assignees: Robert Bosch Automotive Steering GmbH, Schwäbisch Gmünd (DE); Robert Bosch GmbH, Stuttgart (DE)

(*) Notice: Subject to any disclaimer, the term of this patent is extended or adjusted under 35 U.S.C. 154(b) by 80 days.

(21) Appl. No.: 15/743,773

(22) PCT Filed: Jun. 17, 2016

(86) PCT No.: PCT/EP2016/063999
§ 371 (c)(1),
(2) Date: Jan. 11, 2018

(87) PCT Pub. No.: WO2017/008997
PCT Pub. Date: Jan. 19, 2017

(65) Prior Publication Data
US 2018/0201301 A1     Jul. 19, 2018

(30) Foreign Application Priority Data
Jul. 14, 2015   (DE) .................. 10 2015 111 342

(51) Int. Cl.
*B62D 5/04* (2006.01)

(52) U.S. Cl.
CPC ........... *B62D 5/046* (2013.01); *B62D 5/0409* (2013.01); *B62D 5/0481* (2013.01)

(58) Field of Classification Search
CPC ..... B62D 5/046; B62D 5/0409; B62D 5/0481
See application file for complete search history.

(56) References Cited

U.S. PATENT DOCUMENTS

2012/0239254 A1* 9/2012 Heilig .................. B62D 5/0481
701/41

FOREIGN PATENT DOCUMENTS

| DE | 10 2007 014 344 A1 | 10/2008 |
| DE | 10 2007 014 345 A1 | 10/2008 |

(Continued)

OTHER PUBLICATIONS

International Search Report corresponding to PCT Application No. PCT/EP2016/063999, dated Oct. 18, 2016 (German and English language document) (5 pages).

*Primary Examiner* — Todd M Melton
(74) *Attorney, Agent, or Firm* — Maginot, Moore & Beck LLP (57) ABSTRACT

The disclosure relates to a method and to devices for operating a power steering system. wherein a motor torque applied by an electric motor is superposed on a specified manual torque, wherein a beginning freezing of the power steering system is detected by means of suitable measures, and wherein the electric motor is controlled with an oscillating control signal to avoid the freezing of the power steering system, whereby an oscillating application of a shaking torque to the power steering system, applied by the electric motor, is effected. A control signal that has first time spans in which the control signal has an increased amplitude and second time spans in which the control signal has no amplitude or a reduced amplitude is generated, whereby the shaking torque is produced with an increased maximum torque in the first time spans, without thermal overloading of the electric motor.

20 Claims, 4 Drawing Sheets

(56) References Cited

FOREIGN PATENT DOCUMENTS

| | | |
|---|---|---|
| DE | 10 2007 039 212 A1 | 2/2009 |
| DE | 10 2010 002 803 A1 | 5/2011 |
| EP | 2 496 461 | 5/2011 |
| JP | 11-49013 A | 2/1999 |
| JP | 2001-48032 A | 2/2001 |
| JP | 2002-249059 A | 9/2002 |
| JP | 2013-510034 A | 3/2013 |
| WO | 2008/116555 A1 | 10/2008 |

* cited by examiner

METHOD AND DEVICE FOR OPERATING A POWER STEERING SYSTEM

This application is a 35 U.S.C. § 371 National Stage Application of PCT/EP2016/063999, filed on Jun. 17, 2016, which claims the benefit of priority to Serial No. DE 10 2015 111 342.2, filed on Jul. 14, 2015, in Germany, the disclosures of which are incorporated herein by reference in their entirety.

The disclosure concerns a method for operating a power steering system and a device for carrying out the method.

In a power steering system of a motor vehicle, a motor torque is usually superimposed by means of an electric motor on the manual torque applied by a driver. The superimposition is often carried out by a superposition unit in the form of a superposition gearbox. Because the power steering system is used outdoors as a rule, it is exposed to external influences, in particular environmental and temperature influences. This can adversely affect the functionality of the steering. In this case, in particular the Possible freezing of the power steering system by penetrating water represents a particular problem.

Methods are known with which the freezing of the power steering system is detected and countermeasures are initiated. In DE 10 2010 002 803 A1, a method for operating a power steering system is disclosed, with which a motor torque applied by an electric motor is superimposed on a specified manual torque in a superposition unit, wherein freezing of the power steering system is detected by analyzing revolution rate patterns of the electric motor. As a countermeasure against the incipient freezing of the power steering system (see [0011], [0020] and [0036]), the electric motor is actuated with an oscillating control signal that causes an oscillating application of the motor torque applied by the electric motor.

In DE 10 2007 014 344 A1, a method for detecting incipient freezing of a power steering system is disclosed, wherein so-called stick-slip effects are detected that indicate incipient freezing of the power steering system. As a countermeasure (see [0009] ff.), the electric motor is cyclically energized in alternating directions, wherein the cyclical current signal causes crystallized liquids in the power steering system to shake freely. The cyclical current signal can also be superimposed on the operating current signal, so that the free shaking occurs while driving. Moreover, the driver can be warned of the freezing of the steering by the free shaking. In order to nevertheless keep the adverse effect on the driver small, the frequency of the cyclical current signal is selected to be greater than 20 Hz or preferably even greater than 40 Hz.

Consequently, in the known method cyclically oscillating control currents that cause free shaking of the power steering system are produced as countermeasures against freezing of the power steering system. In other words: it is known that to avoid freezing of the power steering system the electric motor is actuated with an oscillating control signal, whereby an oscillating application to the power steering system of a shaking torque applied by the electric motor is brought about. It is also known to select the frequency of the oscillating control signal to be somewhat greater than 20 Hz, preferably greater than 40 Hz. As a result, the adverse effect on the driver can be reduced; however, the relatively high frequency results in the still relatively large and hence inertial masses of the power steering system not being able to be freely shaken sufficiently strongly. Moreover, the oscillating motor currents may not have amplitudes that are too high, as otherwise there is a risk of overheating of the electric motor and/or the controller or the control unit.

It is the object to propose a method for operating a power steering system with which effective countermeasures against detected freezing can be carried out while overcoming the aforementioned problems. In particular, the power steering system should also be able to be freely shaken sufficiently strongly while driving without negative impairment of the driver, wherein overheating of the electric motor and/or control unit is avoided.

The object is achieved by a method for operating a power steering system with the features of the disclosure and by devices with the features of the disclosure.

It is accordingly proposed to actuate the electric motor with an oscillating control signal having periods with increased amplitude and periods with zero amplitude or with only reduced amplitude in order to avoid freezing of the power steering system, whereby in the periods with increased amplitude the electric motor can apply a shaking torque with an increased maximum torque without thermal overloading of the electric motor or the controller thereof occurring. Thus (short-term) large shaking torques or shaking effects can be achieved without risk of the electric motor and/or the control unit overheating. Large shaking torques can be produced thereby that are always replaced by pauses with zero motor torque or a small motor torque. In particular, short-term large motor torques are produced that alternate with pauses in which no motor torque is produced. The control electronics and/or the motor is thereby protected against overheating without the aforementioned disadvantages having to be accepted.

Preferably, the (first) periods, in which relatively large shaking torques are produced, alternate with (second) periods or pauses, in which no or only very small shaking torques are produced.

Very different signal shapes for the oscillating control signal can be used. The signal shape can for example be based on rectangular or triangular shapes; but any other type of signal shapes can also be implemented.

The normal operational control for servo assistance is preferably deactivated during the use of the oscillating control signal. But both control signals can also be produced and used (shaking and normal mode), wherein by means of the characteristic curve the oscillating control signal is only active if no or only a very small servo assistance is being carried out. Thus, in parallel with the shaking there is a change to a special servo characteristic curve. This then runs in parallel with the shaking. If there is no significant steering, there is no component from the operational control signal. The oscillating control signal can act uninterruptedly and can freely shake the steering. if steering is occurring, then this usually only occurs briefly and with high torque on the "steep" flank; in this case the shaking torque has little disturbing effect.

With the use of the method, the power steering system or at least some regions thereof can be viewed as a freely oscillating system with a natural frequency. In this case, it is advantageous if the oscillating control signal is produced with a (possibly variable) frequency that lies somewhat above the natural frequency, in particular 5-10% above the natural frequency. The natural frequency is in this case the resonant frequency of the freely oscillating system with the free ends in the form of the motor and the steering wheel.

During normal operation of the power steering system, an operational control signal is produced that determines the size of the applied motor torque. The oscillating control signal, which determines at least the size and frequency of the shaking torque, can be produced in addition to or alternatively to the operational control signal. In this connection, it can be advantageous if the oscillating control signal is produced alternatively to the operational control signal, wherein to change between the oscillating control signal and the operational control signal a transition function, in particular a ramp function, is used. Following the temporally brief transition, the motor is thus now being actuated only by the oscillating control signal. As a result, there are clear conditions for the heating of the motor. With the oscillating control signal, the heating capability of the motor and/or control unit can be fully utilized.

If the oscillating control signal is used in addition to the operational control signal, then it is advantageous for the operational control signal to change to a servo characteristic curve that has no servo assistance or only a very small servo assistance for small manual torques, and that only has significant servo assistance for larger manual torques. The transition is carried out advantageously by means of ramps for the servo characteristic curve and the shaking torque. Thus, approximately the same conditions apply for small steering torques as for alternative use of the operational control signal and the oscillating control signal. The thermal capacity of the motor and/or control unit can likewise be substantially utilized. Servo assistance is nevertheless available for large steering torques. As a result, a frozen steering system can be freed with still larger motor torque, or an avoidance maneuver can be supported. Since said state only lasts only a very short time, it does not significantly affect the temperature. Mutual interference between the two actuations also remains limited. It can also be useful to operate the power steering system so that a special operational control signal is produced for servo assistance during the shaking operation of the power steering system, wherein the servo characteristic curve used for small applied manual torques has no servo assistance or only a very small servo assistance, and wherein the oscillating control signal is carried out in parallel with servo assistance.

The disclosure also proposes a device for carrying out the method, wherein the device actuates the electric motor in the power steering system that produces the motor torque in order to superimpose said motor torque on the specified manual torque by means of a superposition unit, wherein the device is provided to detect incipient freezing of the power steering system by analyzing revolution rate patterns of the electric motor, and wherein to prevent freezing of the power steering system the device actuates the electric motor with an oscillating control signal, whereby said actuation causes an oscillating application to the power steering system of a shaking torque applied by the electric motor. According to the disclosure, the oscillating control signal has one or more periods with increased amplitude and one or more periods in which the oscillating control signal has zero amplitude or only a very small amplitude. The device is preferably implemented in a control unit connected to the electric motor.

Furthermore, the disclosure discloses a power steering system that is equipped with such a device.

The disclosure and the advantages resulting therefrom are now disclosed using a detailed description, wherein reference is made to the accompanying schematic drawings:

BRIEF DESCRIPTION OF THE DRAWINGS

Brief Description of the Figures

FIG. 2 a-c) that represents examples of control signals according to the disclosure and correspondingly produced shaking torques compared to a usual control signal;

DETAILED DESCRIPTION

Figure 1:
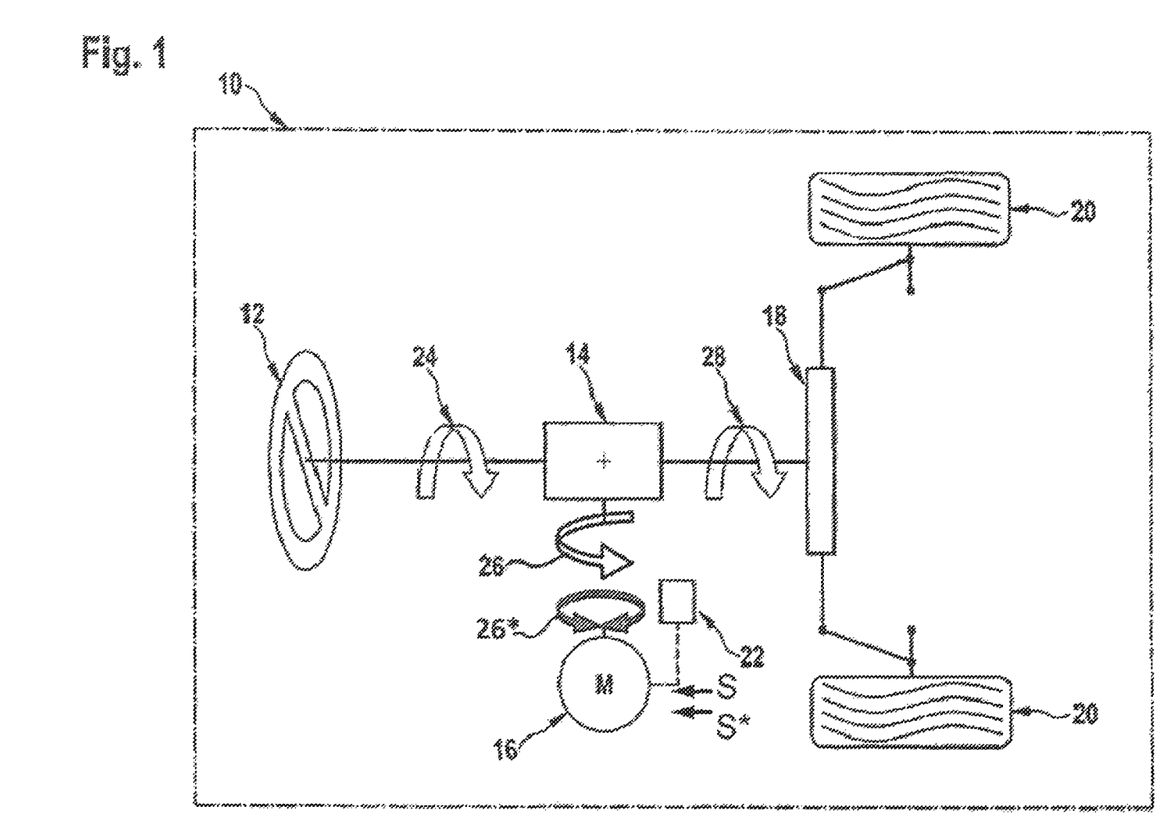
FIG. 1 that shows the basic design of a power steering system according to the disclosure.

FIG. 1 shows in a schematic representation the design of a power steering system 10 for a motor vehicle. The power steering system comprises inter alia a steering control 12 that is embodied as a steering wheel, an electric motor 16 and a superposition unit 14 that superimposes a motor torque 26 applied by the electric motor 16 on a specified manual torque 24. The superposition unit 14 is implemented here by a superposition gearbox that provides at the output a resultant acting torque 28 for the actual steering gearbox, which for example consists of a rack 18 in which a steering pinion engages. A displacement of the rack finally results in steering of the steered wheels 20.

For actuating the electric motor 16, a device embodied as a control unit 22 is arranged that produces an operational control signal S or provides corresponding motor currents during the normal driving mode.

In order to now prevent freezing of the electric motor effectively, the control unit 22 is designed, in addition to the actuation of the electric motor 16, to detect whether there is an impairment, for example freezing, of the power steering system 10. The detection of incipient freezing of the steering is not the main point of the present disclosure and can be achieved using any known method. The present disclosure is aimed at the problem of how countermeasures can be taken to prevent freezing of the steering highly effectively and without overloading the motor and/or control unit.

In order to now prevent such a hazardous state, according to the disclosure an oscillating motor torque or shaking torque 26* is produced using an oscillating control signal, which can be subjected to the actual (acting as the servo assistance) motor torque 26. The shaking torque is preferably produced if no or only a very small servo assistance is necessary, such as for example during straight-line driving. The operational control signal or the servo assistance can be temporarily deactivated for a brief period for this, so that exclusively the oscillating control signal or shaking torque is acting and the steering can effectively vibrate freely. During this, short control pulses are preferably produced that result in brief increased torque values without overheating of the motor and/or control unit occurring. In order to alleviate a hard switch-off or switching back on of the servo assistance, ramp functions are used. Alternatively to switching off and switching back on, the characteristic curves used by the servo assistance can also be changed so that the servo assistance does remain active, but is only used from a high steering torque. As a result, the free shaking of the frozen steering is virtually unaffected by the servo assistance (in regions of low steering torque); the emergency mode assistance remains fully maintained however.

The method described can be implemented in a microprocessor or an arithmetic unit of the control unit. In this case, the method is implemented in software or a computer-implemented algorithm that is implemented automatically and detects and processes technical variables.

Thus, if incipient freezing of the steering is detected, then countermeasures are initiated; in particular, an oscillating action on the power steering system 10 by the electric motor

16 is initiated. In such a case, the control unit 22 produces a control signal S* that comprises an oscillating profile and thereby actuates the motor 16 to shake the power steering system 10 freely.

The control signal S* can be produced and applied while driving with active steering by the control signal S* being produced in addition to the operational control signal 6, and is formed by superimposing a summation control signal S+S*. It can also be advantageous to produce the signals only alternately, i.e. to only produce the control signal S* if the operational control signal S adopts the value zero. Furthermore, transitions between S and S*, for example in the form of ramp functions, can also be formed. Many versions are possible. However, the control signal S* is preferably produced using a rectangular function that comprises temporal pauses that alternate with relatively large amplitudes.

With the oscillating control signal S* and the shaking torque 26* caused thereby, according to the disclosure the frequency is adjusted to be slightly above the natural frequency of the oscillating system that constitutes the steering.

Figure 2:
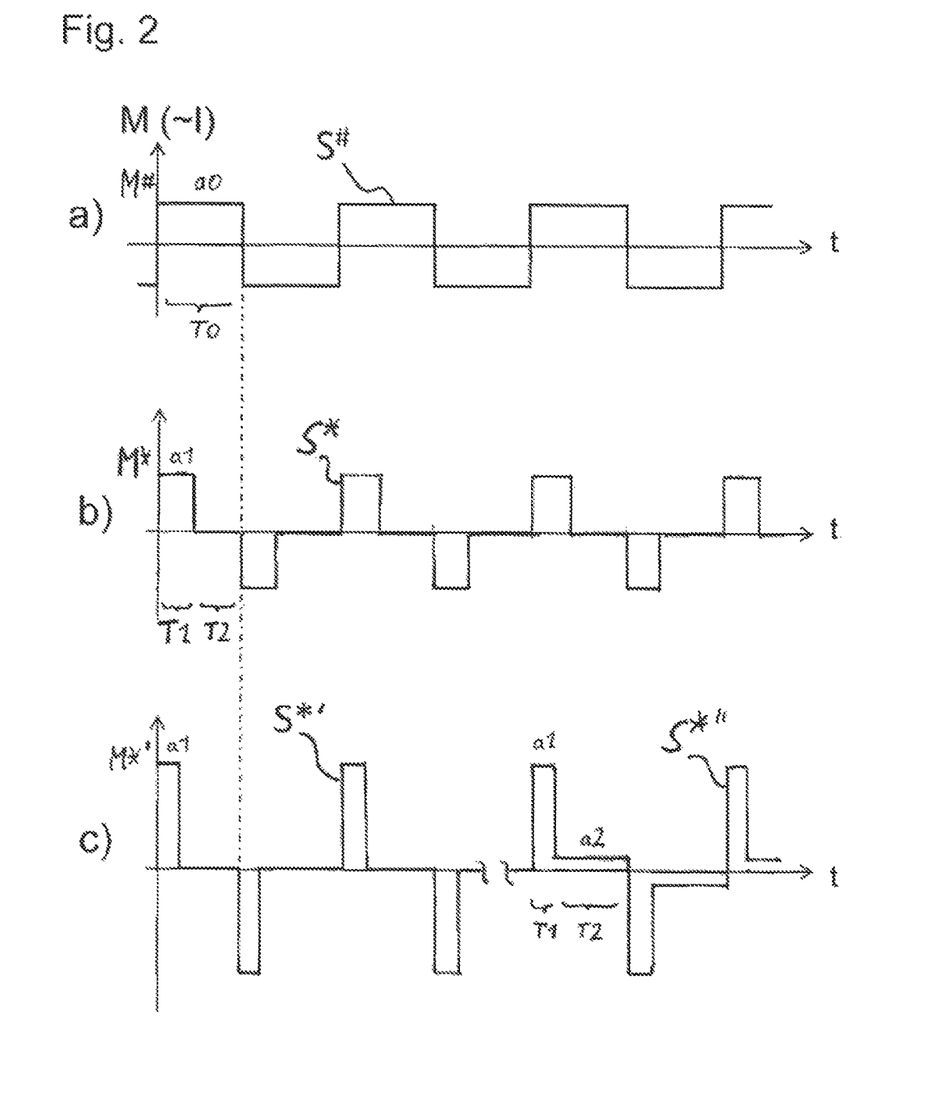

FIGS. 2*a*)-c) show examples of control signals or shaking torques produced according to the disclosure in comparison with a conventional oscillating control signal. Using FIG. 2*a*), first the profile of a conventional control signal S# is shown, which corresponds to a continuous change between a positive and negative amplitude. In each case for a period of T0, the uniformly equal amplitude a0 has a positive or negative sign. With such a control signal S#, a corresponding shaking torque can be produced by means of the electric motor 16. However, the inventor has recognized that the shaking torque cannot be increased arbitrarily by increasing the amplitude a0, since this would result in overheating of the motor or the controller thereof. Thus, the amplitude a0 and the maximum torque M# resulting therefrom are limited.

According to the disclosure, an oscillating control signal is now produced that enables the motor to be actuated with a relatively high amplitude a1 without overheating of the motor itself or the controller thereof having to occur.

Using FIG. 2*b*), the basic structure of such an oscillating control signal S* is shown. The control signal S* comprises at least two different periods T1 and T2, of which one is provided with an increased amplitude a1 and the other has a zero amplitude (or a reduced amplitude; see FIG. 2*c*). As a result, periods T2 or pauses in the signal profile are thus produced, in which a zero signal amplitude or only a very small signal amplitude prevails, so that higher amplitudes a1 or max. shaking torques M* can definitely be produced in the periods T1 without overheating the motor or the electronics thereof.

Because the electrical power loss is proportional to the square of the stator current, by reducing the active period T1 by half (T1=50% T0), the amplitude can be increased to the multiple $\sqrt{2}$=1.41.

As FIG. 2*c*) clearly shows, with a further reduction of the period T1, the amplitude a1 can be increased still further. As a result, a significant increase of the shaking torques produced to M* or M*' is enabled very effectively without risking overheating of the motor or the controller thereof.

The right-hand region of FIG. 2*c*) is only intended to show that periods with low amplitude a2 can also be produced in alternation with those of increased amplitude a1; and it is intended to indicate that many versions and other signal shapes can be produced within the scope of the disclosure.

As a result of an oscillating control signal S* being produced that does not bring about continuous shaking torques with constant amplitude, it can be achieved that shaking torques 26* with high maximum amplitude can be produced, so that the inertial mass of the system is also overcome better in order to effectively shake freezing components freely. The increased amplitudes also result in the amplitude of motion (rotation angle of the motor shaft) being increased. Owing to the discontinuous signal profile, short-term or pulsed shaking torques 26* with high amplitudes can be produced without the motor 16 and/or the control electronics 22 being overloaded or overheated.

Furthermore, assistance during emergency operation with high steering torque is possible, which is described in more detail below.

The free shaking or the freezing prevention can be carried out when the servo assistance is deactivated or even during the operation of the steering. For this there would be a changeover between different servo characteristic curves.

The transition can for example be carried out smoothly by means of ramp functions. It can thereby be achieved in particular that the shaking torques 26* or amplitudes of motion for free shaking of the freezing components are produced substantially independently of the servo characteristic curve that is actually used. Preferably, however, the servo assistance is switched off or set to zero once the shaking torque for free shaking of the steering is produced. Otherwise, the shaking torque could interfere with the normal control of the servo assistance; this is because the shaking results in effects that interfere with the sensor side (torsion bar). The steering is thus either in the normal mode of the steering, i.e. servo assistance corresponding to the servo characteristic curve, or in a shaking mode, in which only the shaking torque is produced and the normal servo assistance is turned off (emergency mode).

As has already been described using FIG. 2*b*), the oscillating control signal S* and the shaking torque 26* brought about thereby has a discontinuous profile, in which temporal signal pauses T2 occur. For example, as a basic signal shape a rectangular signal is produced comprising four temporal components of 25% each: in the present example, there is 25% for a torque to the left (positive amplitudes), 25% for no torque (amplitude=zero), 25% for a torque to the right (negative amplitude) and 25% for no torque produced again and so on. By means of such a discontinuous signal generation it is possible to produce greater maximum shaking torque for the same motor heating. If for example in the case of a continuous shaking torque profile (rectangular function without pauses), an amplitude of 2 Nm were to be produced, then in the case of a discontinuous profile with 50% duty cycle (see FIG. 2*b*), the amplitude can be increased by a factor $\sqrt{2}$≈1.41. The smaller the duty cycle (pulse duration to periodic duration), the greater can be the amplitude produced.

The disclosure especially concerns the discontinuity in the time region, wherein rectangular functions are preferably used. The disclosure is however neither specifically limited to time components nor to the signal shape, rather many types of discontinuities can be provided in the control signal S* produced.

FIG. 2*c*) shows further signal profiles and only indicates the wide possibility of different signal shapes that can be suitable for implementation. In most application cases, however, a rectangular function such as shown in FIG. 2*b*) may suffice to protect the steering against the freezing effectively.

The frequency for the oscillating control signal is selected to be higher than the natural frequency of the free oscillator with the end points in the form of the steering wheel and the motor. In this case, as many mass combinations as possible should be taken in to account. In many cases of mass-produced vehicles, the natural frequency is at a max. 20 Hz. The frequency of the shaking torques is then set at preferably slightly above the maximum natural frequency, for example 5-10% above the maximum natural frequency. This is because the less the frequency is above the natural frequency, the more movement is obtained. Therefore, the shaking frequency should not lie too far above the natural frequency.

The assistance is turned off when switching off the oscillating motor torque. This is preferably carried out by means of ramp functions. This means that the steering is either in the normal mode, i.e. with servo assistance according to the characteristic curve, or that the steering is being freely shaken by the oscillating shaking torque produced, wherein the servo assistance is inactive.

Alternatively or even in addition to this, changeovers can be made between servo characteristic curves. In particular, a changeover to servo characteristic curve can be made that has no or only a very small assistance up to a defined steering torque, and that has a large assistance for large steering torques. As a result, a very small impairment is achieved during straight-line driving. In the case of an emergency, a large assistance is nevertheless available. The changeover of servo characteristic curves and/or oscillating torques is preferably carried out by means of ramp functions or similar transition functions. In other words: a servo characteristic curve is selected so that assistance is carried out only at large steering torques. The shaking occurs essentially at smaller steering torques, so that the functions are not significantly interfered with. If large steering torques occur only once (for example when evading or parking), the functions are still superimposed, but only briefly, so that subsequently no problems arise.

Figure 3:
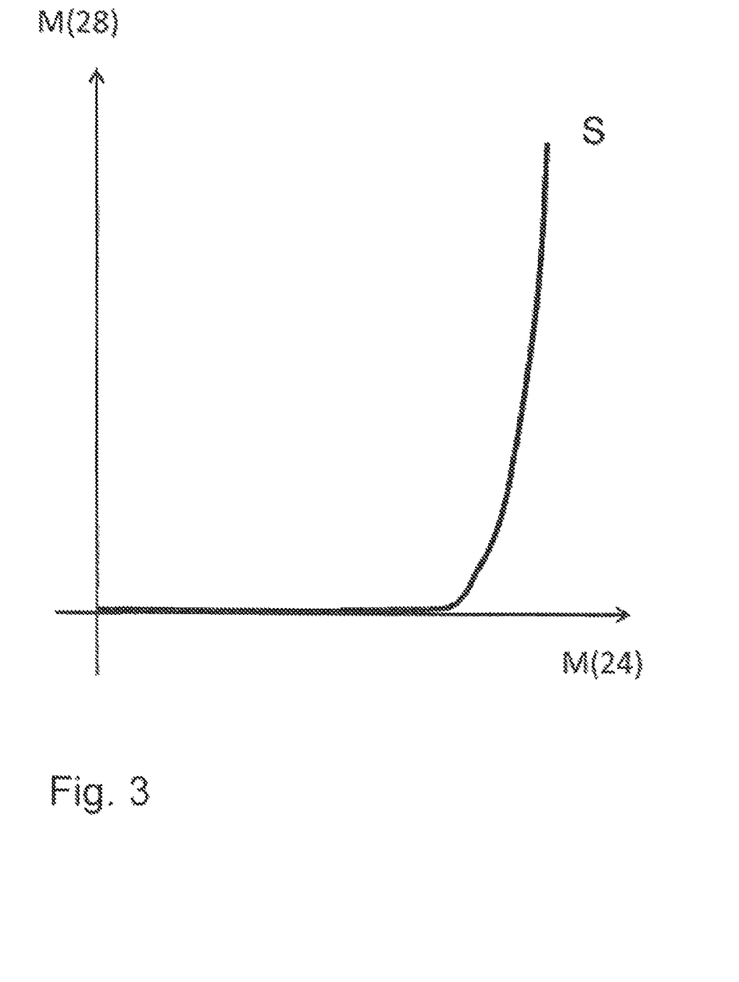
FIG. 3 that represents the profile of a characteristic curve for the operational control signal.

Using FIG. 3, such a servo characteristic curve is represented, wherein the torque M(28) produced at the output of the superposition gearbox (see 14 in FIG. 1) is applied over the manual torque M(24) introduced at the steering wheel. As the profile of the graph in FIG. 3 shows, there is no servo assistance in the lower region, i.e. for small manual torques M(24) of for example less than 6 Nm. Only at larger manual torques (>6 Nm) is a progressive servo assistance produced. The free shaking of the steering is primarily carried out if the servo control of the steering is in the lower region (<6 Nm), i.e. for example during straight-line driving and small steering maneuvers. Steering maneuvers with assistance (for example tight cornering) only occur rarely. Because of the steep amplification characteristic curve, the shaking does not significantly affect the assistance.

The generation of the normal operation control signals S and the oscillating control signals S* for the actuation of the electric motor 16 is carried out by means of the device 22 embodied as a control unit. For this a computer program with program coding means is used, wherein the computer program is executed in the microprocessor of the control unit 22. The computer program can be embodied as a computer program product, wherein the program coding means is stored on a computer-readable data medium, such as for example a CD, DVD, hard disk or USB stick.

Figure 4:
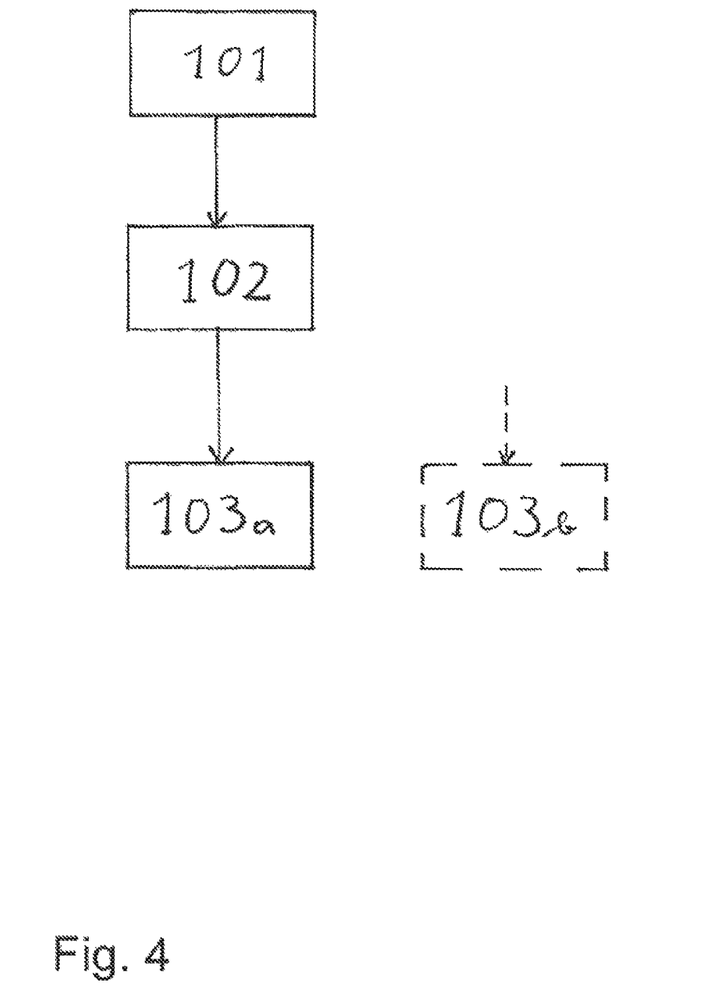
FIG. 4 that represents a simplified flow chart of the control method according to the disclosure.

In FIG. 4, a schematic flow chart for the method 100 according to the disclosure is shown.

If in a step 101 it is determined that the steering is tending to freeze or is frozen, the generation and use of oscillating control signals are carried out in the subsequent steps, by means of which the steering can be effectively freely shaken without the motor or the control electronics overheating.

In the step 102, a control signal, such as for example the S* of FIG. 2b), is produced, wherein in particular the frequency f lies only slightly above the natural frequency f0. In the step 103a, the actual operational control (servo assistance) is turned off for as long as the shaking torque is used. Alternatively, the step 103b can also be carried out, in which the current servo characteristic curve is replaced by another (see FIG. 3), so that free shaking and servo assistance only briefly superimpose for special steering maneuvers. Alternatively, on exceeding a steering torque limit, the shaking torque can be reduced or turned off. This preferably occurs by means of a temporal ramp. On falling below the limit, the shaking torque is turned on again. This is preferably also by means of a temporal ramp Regarding the parameterization, it has been shown that preferably the first periods T1 are no more than 50% of the continuous periods T0, and that the increased amplitude a1 is at least 70% greater than the uniform amplitude a0. In many applications, the second periods T2 can form real pauses, in which the control signal S* has zero amplitude, wherein the second periods T2 are greater than the first periods T1, in particular by at least 50%. If reduced amplitudes a2 are also produced, the reduced amplitude a2 should be no more than 50% of the uniform amplitude a0 and no more than 30% of the increased amplitude a1. As regards the frequency of the oscillating control signal S*, this should be produced with a variable frequency f that lies no more than 30% above the natural frequency of the system, in particular no more than 5-10% above the natural frequency of the system.

In summary, a method and devices for operating a power steering system 10 of a motor vehicle are proposed, wherein to prevent freezing of the power steering system the electric motor 16 is actuated with an oscillating control signal S* with first periods T1 in which the control signal S* has an increased amplitude a1, and second periods T2 in which the control signal S* has zero amplitude or a reduced amplitude a2, whereby in the first periods T1 the shaking torque 26* applied by the electric motor 16 can be produced with an increased maximum torque M* without thermally overloading components of the electric motor 16 or the controller thereof. It can be provided that the oscillating control signal also has a plurality of periods with increased amplitudes and one or more periods (pauses) with zero amplitude or reduced amplitudes.

The operational control signal S produced during normal operation of the power steering system 10 for servo assistance can be turned off during the use of the oscillating control signal S*. Should a changeover between the oscillating control signal S* and the operational control signal S take place, then a transition function, in particular a ramp function, can be used. However, both signals S and S* can also be produced and used (shaking and normal mode), wherein a characteristic curve is preferably used (see FIG. 3) that ensures that the use of the oscillating control signal S* alone for the free shaking of the steering is effective with as large a temporal component as possible. Thus, for the generation of the operational control signal S a servo characteristic curve is used that has no servo assistance or only a very small servo assistance for smaller applied manual torques 24, wherein the oscillating control signal S* is only produced and used if no servo assistance or only a very small servo assistance is carried out. Alternatively, on exceeding a steering torque limit, the shaking torque can be reduced or turned off. This is preferably carried out by means of a temporal ramp. On falling below the limit, the shaking torque is turned on again. This is also preferably carried out by means of a temporal ramp. The method according to the disclosure is carried out by a device that is preferably a control unit 22 that is connected to the electric motor 16.

In summary, a method and devices for operating a power steering system of a motor vehicle are proposed, with which a motor torque applied by an electric motor is superimposed on a specified manual torque in a superposition unit, wherein incipient freezing of the power steering system is detected by suitable measures, such as for example analyzing revolution rate patterns of the electric motor, and wherein to prevent freezing of the power steering system the electric motor is actuated with an oscillating control signal, whereby an oscillating application to the power steering system of a shaking torque applied by the electric motor is brought about. According to the disclosure, instead of an oscillating control signal with a uniform amplitude acting in continuous periods, now a control signal is produced with first periods in which the control signal has an increased amplitude, and second periods in which the control signal has zero amplitude or a reduced amplitude, whereby in the first periods the shaking torque applied by the electric motor can be produced with an increased maximum torque without thermal overloading of the electric motor.

REFERENCE CHARACTER LIST

10 power steering system
12 steering control or steering wheel
14 superposition unit or superposition gearbox
16 electric motor
18 rack
20 steered wheels
22 control unit
24 manual torque (applied by the driver)
26 motor torque (produced by the electric motor)
26* shaking torque (produced by the electric motor for free shaking)
28 acting torque (output torque of the superposition gearbox)
S operational control signal (produced by the control unit for motor torque) for servo assistance
S# usual oscillating control signal (produced by the control unit for shaking torque) with uniform amplitude a0
S* oscillating control signal (for shaking torque) according to the disclosure produced with increased amplitude a1 within first period T1 and zero amplitude or reduced amplitude a2 within second period T2
**S*', S*''** different versions of oscillating control signals
101-103a/b steps of a process according to the disclosure (simplified)

The invention claimed is:

1. A method for operating a power steering system of a motor vehicle, the method comprising:
    superimposing a motor torque applied by an electric motor on a specified manual torque using a superposition unit;
    detecting incipient freezing of the power steering system;
    preventing the freezing of the power steering system by actuating the electric motor to apply, during a shaking operation, a shaking torque to the power steering system with a maximum torque using an oscillating control signal; and
    producing, during the shaking operation, the oscillating control signal with first periods having a first amplitude and second periods having one of a zero amplitude and a second amplitude that is less than the first amplitude, whereby in the first periods the shaking torque is applied with an increased maximum torque without thermal overloading of components of the electric motor and a controller thereof.

2. The method for operating a power steering system as claimed in claim 1, wherein the oscillating control signal has one or more periods with the first amplitudes and one or more periods with one of zero amplitudes and the second amplitudes.

3. The method for operating a power steering system as claimed in claim 1, wherein:
    the first periods are one of shorter than the second periods and equal in length to the second periods; and
    the first amplitude is at least 70% greater than a uniform amplitude.

4. The method for operating a power steering system as claimed in claim 1, wherein:
    the oscillating control signal has a zero amplitude during the second periods; and
    the second periods are at least 50% longer than the first periods.

5. The method for operating a power steering system as claimed in claim 1, wherein the second amplitude is no more than 50% of a uniform amplitude and no more than 30% of the first amplitude.

6. The method for operating a power steering system as claimed in claim 1, wherein at least some regions of the power steering system represent a freely oscillating system with a natural frequency, and that the oscillating control signal is produced with a variable frequency that is no more than 20% greater the natural frequency of the system.

7. The method for operating a power steering system as claimed in claim 6, wherein the variable frequency is 5-10% greater the natural frequency of the system.

8. The method for operating a power steering system as claimed in claim 1, further comprising:
    producing an operational control signal during normal operation of the power steering system for servo assistance, the operational control signal configured to determine a magnitude of the applied motor torque, the oscillating control signal configured to determine at least a magnitude of the shaking torque and a frequency of the shaking torque; and
    producing the oscillating control signal one of in addition to and alternatively to the operational control signal.

9. The method for operating a power steering system as claimed in claim 8, further comprising:
    producing the oscillating control signal alternatively to the operational control signal, wherein a transition function, is used to change between the oscillating control signal and the operational control signal.

10. The method for operating a power steering system as claimed in claim 9, wherein the transition function is a ramp function.

11. The method for operating a power steering system as claimed in claim 1, further comprising:
    producing an operational control signal during the shaking operation of the power steering system for servo assistance, wherein a servo characteristic curve used for small applied manual torques has one of no servo assistance and a first amount of servo assistance; and
    producing the oscillating control signal only if one of no servo assistance and the first amount of servo assistance is being carried out.

12. The method for operating a power steering system as claimed in claim 1, further comprising:

producing an operational control signal during the shaking operation of the power steering system for servo assistance, wherein a servo characteristic curve used for small applied manual torques has one of no servo assistance and a first amount of servo assistance; and producing the oscillating control signal in parallel with the servo assistance.

13. The method for operating a power steering system as claimed in claim 1, the detecting of the incipient freezing comprising:

analyzing revolution rate patterns of the electric motor to detect the freezing.

14. A device in a power steering system of a motor vehicle, the device configured to:

actuate an electric motor configured to produce a motor torque to superimpose the motor torque on a specified manual torque using a superposition unit, detect incipient freezing of the power steering system;

prevent freezing of the power steering system by actuating the electric motor with an oscillating control signal to apply a shaking torque having a maximum torque; and produce the oscillating control signal with first periods having a first amplitude and second periods having one of a zero amplitude and a second amplitude, whereby in the first periods the shaking torque is applied with an increased maximum torque without thermal overloading of components of the electric motor and a controller thereof.

15. The device as claimed in claim 14, wherein the device is a control unit that is connected to the electric motor.

16. The device as claimed in claim 14, the device being further configured to analyze revolution rate patterns of the electric motor to detect the freezing.

17. A power steering system for a motor vehicle, the power steering system comprising:

a steering control;

an electric motor;

a superposition unit configured to superimpose a motor torque applied by the electric motor onto a specified manual torque; and a device configured to:

detect incipient freezing of the power steering system;

prevent the freezing of the power steering system by actuating the electric motor with an oscillating control signal to apply a shaking torque having a maximum torque; and produce the oscillating control signal with first periods having a first amplitude and second periods having one of a zero amplitude and a second amplitude, whereby in the first periods the shaking torque is applied with an increased maximum torque without thermal overloading of components of the electric motor and a controller thereof.

18. The method for operating a power steering system as claimed in claim 1, wherein a computer program is executed on a microprocessor to perform the method.

19. The method for operating a power steering system as claimed in claim 18, wherein the computer program is stored on a computer-readable data medium.

20. The power steering system as claimed in claim 17, the device being further configured to analyze revolution rate patterns of the electric motor to detect the freezing.

* * * * *

UNITED STATES PATENT AND TRADEMARK OFFICE
CERTIFICATE OF CORRECTION

PATENT NO. : 10,471,983 B2
APPLICATION NO. : 15/743773
DATED : November 12, 2019
INVENTOR(S) : Wilfried Leutner, Viktor Fast and Rainer Woeger It is certified that error appears in the above-identified patent and that said Letters Patent is hereby corrected as shown below:

In the Claims

In Claim 9, at Column 10, Line 51, delete the "," between the words "function" and "is".

Signed and Sealed this
Tenth Day of March, 2020

Andrei Iancu
*Director of the United States Patent and Trademark Office*